March 10, 1959
J. P. RUTH
2,877,098
APPARATUS FOR CONDITIONING EXHAUST GASES FROM
INTERNAL COMBUSTION ENGINES
Filed Feb. 14, 1955
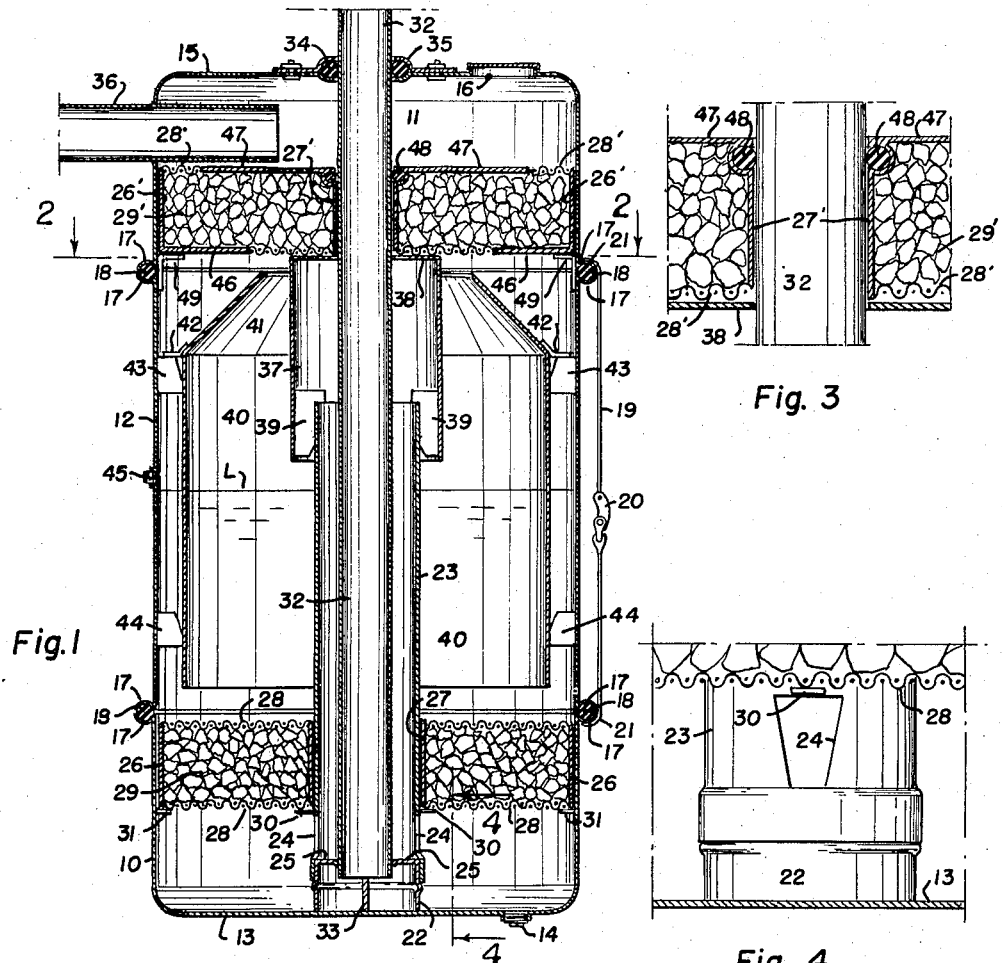
Fig. 1
Fig. 3
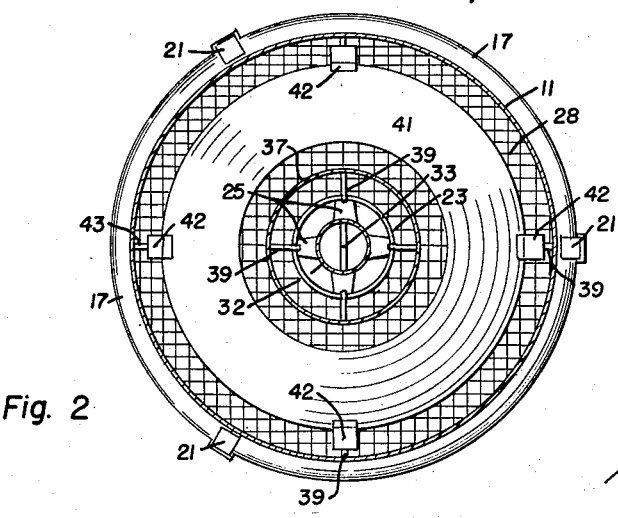
Fig. 2
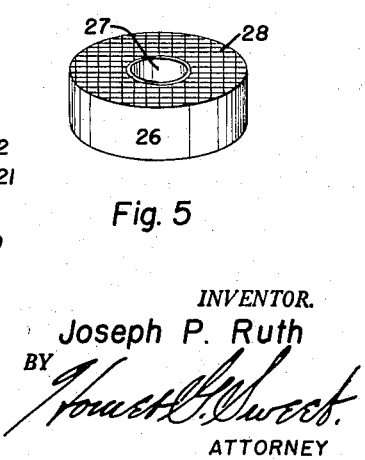
Fig. 4
Fig. 5
INVENTOR.
Joseph P. Ruth
BY
ATTORNEY United States Patent Office 2,877,098
Patented Mar. 10, 1959

2,877,098
APPARATUS FOR CONDITIONING EXHAUST GASES FROM INTERNAL COMBUSTION ENGINES

Joseph P. Ruth, Denver, Colo.

Application February 14, 1955, Serial No. 488,099

5 Claims. (Cl. 23—284)

As a development from and an improvement over the techniques pertinent to and apparatus appropriate for the conditioning of internal combustion engine exhaust gases as taught in my Patents No. 2,611,680, dated September 23, 1952, and No. 2,678,261, dated May 11, 1954, and in my pending applications for Patent Serial No. 396,049, filed December 3, 1953, now Patent No. 2,776,873, dated January 8, 1957, Serial No. 462,891, filed October 18, 1954, now Patent No. 2,785,963, dated March 19, 1957, and Serial No. 465,790, filed November 1, 1954, now Patent No. 2,785,962, dated March 19, 1957, the instant invention relates to methods and means for the treatment of internal combustion engine exhaust gases, and more especially the exhaust gases from Diesel-type engines, for suppression and elimination of the irritant and noxious properties thereof, and has as an abject to provide a novel method of enhenced effectiveness and novel and improved apparatus employable for the conditioning of exhaust gases with facility, advantage, and improved ameliorative result.

A further object of the invention is to provide a novel and improved method for the conditioning of exhaust gases that is characterized by successive multiple expansions of the gas under treatment in reaction to the gas flow under normal output pressure.

A further object of the invention is to provide a novel and improved method for the conditioning of exhaust gases in reaction to the gas flow under normal output pressure that is characterized by repetitious expansions of the gas in intimate exposure to ameliorating agencies therewith entrained.

A further object of the invention is to provide a novel and improved exhaust gas conditioner operable to effect successive multiple expansions of gases passed therethrough under the influence of the normal gas output pressure.

A further object of the invention is to provide a novel and improved exhaust gas conditioner effective to repetitiously expose gases passed therethrough under the influence of their normal output pressure to intimate contact and admixture with ameliorating agencies.

A further object of the invention is to provide a novel and improved exhaust gas conditioner adapted to accommodate and to functionally coact with ameliorating charges in unit cartridge form.

A further object of the invention is to provide a novel and improved exhaust gas conditioner arranged for facile removal and replacement of ameliorating charges functionally associated therewith in unit cartridge form.

A further object of the invention is to provide a novel and improved construction and correlation of elements constituting an exhaust gas conditioner.

A further object of the invention is to provide a novel and improved construction and organization of elements constituting an exhaust gas conditioner that is simple and relatively inexpensive of production in sizes appropriate for operative association with particular engines, that is convenient of installation in desired use association with either fixed or mobile engines, that is readily separable for facility of servicing and rehabilitation, that is durable and long-lived in practical use, and that is efficient in the attainment of the ends for which designed.

With the foregoing and other objects in view, may invention consists in the nature and sequential correlation of operative steps, and in the construction, arrangement, and operative combination of apparatus elements, as hereinafter set forth, pointed out in my claims, and illustrated by the accompanying drawing, in which—

Figure 1 is a vertical section taken axially through a typical embodiment of apparatus comprised in the invention and appropriate for practice of the improved method.

Figure 2 is a cross section taken substantially on the indicated line 2—2 of Figure 1.

Figure 3 is a fragmentary, detail, partial section, on an enlarged scale, of a sealed slip joint advantageously utilized in the improved apparatus as represented in the laterally-adjacent zone of Figure 1.

Figure 4 is a fragmentary, detail section, on the same scale as Figure 3, taken substantially on the indicated line 3—3 of Figure 1.

Figure 5 is a perspective view of a typical removable and replaceable cartridge unit utilized in the organization according to Figure 1.

As is disclosed in my earlier Patent No. 2,611,680, a method satisfactorily effective for the suppression and elimination of inimical and undesirable properties characteristic of internal combustion engine exhaust gases is distinguished by circulation of the gases under the sole influence of their output pressures through a body of water and subsequently through an intersticed diffusing bed or medium capable, as repetitiously washed and wetted by the gas-water mixture, of neutralizing the acidity of the wetted gases, collecting the drip and condensate from the diffusing bed or medium in and for reuse with the water body, and venting the scrubbed and modified vapors to atmosphere. Using broken limerock, or the equivalent, as a diffusing medium, the method taught by my earlier patent operates to cool, cleanse, and modify exhaust gas fumes, and particularly those from Diesel-type engines, to a degree qualifying the treated gases for delivery within underground workings and other confined spaces where humans are active without adverse effect upon, or hazard to, those present. However, it has been determined that the ameliorating effectiveness of the exhaust gas treatment accomplished as above set forth is directly related to the intimacy and pervasiveness of the gas-water contact established, to the hydrogen ion concentration of the water first encountered by the incoming gases, and to the removal of entrained water from the treated gases prior to their release to atmosphere. Practical application of the realizations just mentioned has resulted in a refinement of the original method to include exposure of the water body to, and circulation thereof through, an intersticed diffusing bed or medium effective to neutralize any acidity in the water first contacted by the incoming gases, thus to enhance the intimacy and completeness of the resulting gas-water mixture, and to provide successive expansions of the gas-water mixture, both prior and subsequent to entrainment of the vapors through an intersticed diffusing bed or medium remote from the water body, whereby to enhance the intimacy and completeness of the gas-water contact, to facilitate condensation of entrained water and removal thereof from the gas stream, and to repetitiously retard the velocity of the gas stream with consequent improved separation of entrained solids, such as carbon particles and the like, therefrom, all in reaction to and as an incident of circulation of the gases under the influence of their output pressures alone.

Manifestly, apparatus appropriate for practice of the improved method as above described may be of varied design and construction, but since a feature critical to successful operation of the method is the circulation of water and gas-water mixtures through diffusing beds or media subject to such gradual consumption as requires periodic rehabilitation thereof, the instant invention includes the provision of apparatus accommodative of the diffusing beds or media in unit cartridge form convenient of removal and replacement in an arrangement suited for practice of the improved method.

A structural organization effective to accomplish all of the purposes and to develop all of the advantages of the present invention is represented by the drawing as a unitary assembly of cooperating elements associated with and largely enclosed within a separable housing comprised from a bottom member 10, a top member 11, and an intermediate member 12. The housing bottom member 10 is a cylindrical, cup-shaped unit formed with an open top and a closed bottom 13 provided with a normally-plugged, drain aperture 14, the housing top member 11 is also a cylindrical, cup-shaped unit of the same diameter as the member 10 adapted for use in inverted position and hence characterized by an open bottom and a closed top 15 interrupted by a circular, central aperture, hereinafter more particularly described, and provided with a normally-capped, access port 16, and the intermediate housing member 12 is a tubular unit of the same diameter as the members 10 and 11, open at both ends, and adapted to register in end-abutting, coaxial relation with and to span between the open ends of the members 10 and 11 to complete a cylindrical housing closed save as hereinafter specified. The members 10, 11, and 12 may be arranged for cooperation as a housing in any expedient manner effective to seal the housing constituted therefrom against leakage of any kind through the joints between the members and at the same time to permit convenient separation of said members for ready removal and replacement of facilities mounted within the housing, a feasible arrangement for separably coupling said members in sealed interrelation being shown in Figures 1 and 2 of the drawing. As represented, annular flanges 17 are formed on and exteriorly about the open ends of the members 10, 11, and 12 in such opposed concavity of their adjacent surfaces as to define a channel for the accommodation of a ring gasket 18 thereby mounted in surrounding relation with the joint between abutted ends of the assembled members, and a plurality of links 19 extensible and retractible in length, as by means of a toggle 20 included in each link, is formed with opposed hooks 21 at the ends of each link adapted to engage over the flanges 17 of the members 10 and 11 and releasably clamp said members to the opposite ends of the intermediate member 12 in compressing relation with the associated gasket 18 when the toggles 20 are operated to shorten the links.

Centrally and interiorly of the housing bottom member 10, a short, tubular sleeve 22 is fixed to, closes against, and upstands coaxially of the housing assembly from the bottom 13 of said member in telescopic engagement with the open lower end of a tubular conduit 23 thereby mounted coaxially of the housing assembly in a length such as to terminate in an open end well above the midheight of the assembly. Vertically-elongated, downwardly-convergent apertures 24 open through opposite sides of the conduit 23 above and immediately adjacent the upper edge of the sleeve 22 as water inlet passages from the bottom housing member 10 to the base of the conduit 23, and angularly-spaced arms 25 instand radially and from the upper edge of the sleeve 22 in registration with and at about the level of the lower margins of the apertures 24.

In accordance with and to give effect to the principles of the invention, the housing bottom member 10 removably and replaceably accommodates a diffusing bed or medium of suitable material in the form of a self-contained unit or cartridge disposed to be traversed by and to act upon water passing to and through the apertures 24. The material utilized for the diffusing bed or medium in conformity with the principles and purposes of the invention is such as will provide an intersticed body through which water may readily pass and of a nature substantially insoluble in water while reactive to the characteristic acidity of the exhaust gas and water mixture to neutralize the same, broken limerock, or the equivalent, being eminently satisfactory. A unit or cartridge of the diffusing material or medium is represented in Figure 5 as a shallow, circular box having an annular outer wall 26, which may be of either solid or foraminous material, sized to telescope freely within the housing bottom member 10, a concentric, annular inner wall 27, expediently of the same material as the wall 26, sized to telescope over and slide freely relative to the conduit 23, and foraminous or reticulate sheets 28 secured to and closing between corresponding margins of said walls 26 and 27 as spaced, parallel top and bottom closures for the unit or cartridge wherebetween is confined a charge 29 of the broken limerock, or equivalent material. The diffusing bed unit or cartridge constituted as shown and described is provided in a thickness, or axial dimension, such as to extend from the upper ends of the apertures 24 to just below the plane of the joint between the members 10 and 12 of the housing, and support for said unit or cartridge is provided in the form of lugs 30 fixedly outstanding radially and exteriorly from the conduit 23 just above the apertures 24 and similar lugs 31 instanding radially and interiorly from the cylindrical wall of the member 10 in coplanar relation transversely of the housing with said lugs 30. Thus, with the housing bottom member 10 separated from the member 12 through release of the links 19, the conduit 23 and diffusing bed unit or cartridge come away from the assembly with the said member to facilitate access to and replacement of the unit or cartridge; the latter lifting readily from the member 10 and over the free end of the conduit in an obvious manner preliminary to insertion of a fresh unit or cartridge in its place.

The exhaust gases to be treated are delivered within and adjacent the base of the conduit 23 by means of a flow line 32 connected to and as an extension of the exhaust gas line of the engine to be served and slidably sealed through the central aperture of the housing top member 11 coaxially of the housing assembly to terminate in an open end within the sleeve 22 and below the plane of the arms 25 thereof. The line 32 is of less maximum diameter than the interior diameter of the conduit 23, whereby to leave an annular space between the telescoped portions of said elements wherethrough gases from the line 32 may uprise with pumping effect upon water incoming to the base of the conduit through the apertures 24, and the arms 25 extend radially and inwardly of the sleeve 22 only so far as to engage the outer wall of the line 32 and function as a spider within and through which the lower end of the line may be centered and steadied, while a baffle 33 fixed to and rising from the bottom 13 of the member 10 diametrically of the sleeve 22 acts as a stop limiting downward penetration of the line within the sleeve to a level well above the said bottom 13 and slightly below the plane of the arms 25 and also serves to divide the gas output from said line for uprise past the arms 25 at the opposite sides of the baffle. Slidable sealing of the line 32 through the top 15 of the member 11 is accomplished by means of a ring gasket 34 surrounding the line in a cupped depression of the top 15 and urged into sealing relation with the line by means of a cupped plate 35 clamped to the said top 15 in complementary, gasket-compressing relation therewith. The gases delivered to the housing assembly through the line 32 are circulated and treated within the housing as hereinafter specified and ultimately rise to and are collected within the housing top member 11 whence they are vented to atmosphere, or to a preferred point of discharge, through and by means of an outlet line 36 sealed through a side wall and radially of said member 11 inwardly adjacent the top 15 of the latter in a projection interiorly of said member such as to space the open inner end of said line well inwardly from the member wall traversed by the line.

The path of gas flow and circulation interiorly of the housing assembly between the upper end of the conduit 23 and the inner end of the outlet line 36 is determined in accordance with and to give effect to the principles of the invention by means definitive of a succession of expansion chambers and including a scrubbing and ameliorating stage. The first of the expansion chambers is associated with and disposed to receive the delivery from the annular space about the line 32 at the upper end of the conduit 23, and is defined by a hood 37, preferably of right cylindrical form, having a diameter exceeding that of the conduit 23, a length greater than the spacing of the upper end of said conduit below the plane of the joint between the housing members 11 and 12, and formed with an open lower end telescopically engageable over the upper end of the conduit and a closure 38 at its upper end centrally apertured to slidably accommodate the line 32. The hood 37 is supported on the upper end of the conduit 23 with its open lower end depending as a skirt over and spacedly about said end of the conduit and with its upper end closure 38 slightly above the joint between the housing members 11 and 12 by means of notched lugs 39 angularly spaced apart within and fixedly instanding radially of the hood adjacent the open lower end thereof to hook over the upper end of the conduit and to depend as spacers between adjacently-overlapped walls of the hood and conduit, lower inner corners of the lugs 39 being beveled to facilitate mounting of the hood on and in centered relation with the conduit in the operative relationship shown in Figure 1. With the hood 37 in place on the conduit 23 as shown and described, the vapors and gas-water mixtures delivered through the annular upper end opening of the conduit are received and expand within the hood, with cooling effect thereon and the generation of turbulence promotive of enhanced gas and water contact, whence escape of the flow under treatment is had through the annular space between the conduit and the lower end of the hood, and outwardly and upwardly about the latter, with a flow direction and velocity conducive to separation of solids and entrained water from the vapor stream for return to and collection within the water body of the apparatus.

A second expansion chamber for the reception and treatment of vapors outflowing from the hood 37 is defined by a tubular shroud 40 of a length and diameter slightly less than the corresponding dimensions of the intermediate housing member 12 and formed with a frusto-conical upper end 41 whereof the upper end, or lesser base, bounds a circular aperture of a diameter somewhat greater than that of the hood 37. The shroud 40 is supported coaxially within the intermediate housing member 12 with the lesser, apertured base of its upper end portion 41 substantially coplanar with the joint between the housing members 11 and 12, and hence slightly below the plane of the hood top closure 38, and its lower end elevated above the plane of the joint between the housing members 10 and 12, by means of angularly-spaced fingers 42 fixedly and radially outstanding from the shroud, expediently adjacent the junction of the tubular and frusto-conical portions thereof, in position to engage upper margins of lugs 43 fixedly instanding in angularly spaced relation from the inner wall of the intermediate housing 12, which lugs 43 are adapted to bridge as spacers between the spacedly-adjacent wall areas of the member 12 and shroud 40, whereby to center the shroud within the member, and have their inner margins beveled to facilitate assembly of the shroud and member 12 in the desired interrelation. Supplementing the centering action of the lugs 43, a set of similar lugs 44 may be carried by the member 12 in position to engage at their inner ends with the outer wall of the shroud 40 slightly above the open lower end of the latter. As arranged for practical use, the housing assembly confines a charge of water in its lower portion which fills the member 10 to submerge the cartridge or unit of diffusing material therein and rises within the member 12 to a maximum level, indicated at "L," somewhat below the lower end of the hood 37 as determined by appropriate means, such as a normally-plugged port 45 in the wall of said member well above the open lower end of the shroud 40. Obviously, the water charge of the apparatus rises well within and closes the lower portion of the shroud 40 as a floor to the expansion chamber defined thereby, so that the vapors introduced from the hood 37 to the interior of the shroud with consequent expansive effect promotive of condensation and advantageous turbulence are constrained to uprise with enhanced velocity through the restricted annular throat about the hood 37 at the upper end of the shroud portion 41 as an incident of their flow through the apparatus. Entrained matter separated from the vapor stream within the shroud 40 is collected in the water charge and circulated therewith through the submerged diffusing bed or medium of the cartridge or unit removably associated with the housing member 10, the solids washed through said bed or medium collecting in the lower zone of said member below the intake level of the apertures 24 and any acidic characteristic so imparted to the water charge being neutralized by the bed or medium to provide for recycling of only uncontaminated water to and through the conduit 23.

The space within the housing member 12 exteriorly about the shroud 40 and above the level of the water charge constitutes a third expansion chamber for the reception, expansion, and turbulent circulation of the vapors outflowing from the upper end of the shroud about the hood 37, which third expansion chamber is upwardly delimited by a diffusing bed or medium of removable and replaceable cartridge unit form disposed to rest upon the upper closure 38 of the hood 37 within and in spanning relation across the housing top member 11. Generally analogous to the cartridge or unit above described for association with the housing bottom member 10, the cartridge or unit associated with the member 11 is constituted as an annular outer wall 26' sized to telescope freely within the member 11, a concentric, annular inner wall 27' sized to telescope over and slide freely relative to the line 32, and foraminous or reticulate sheets 28' as top and bottom closures for the cartridge or unit wherebetween is confined a charge 29' of broken limerock, or the equivalent. Distinguishing from the cartridge or unit carried by the housing member 10, the analogous component associated with the member 11 is formed with an annular, imperforate area 46 closing a peripheral zone of the sheet 28' forming the bottom closure of the cartridge or unit in a width inwardly from the lower margin of the wall 26' such as to expose but a relatively narrow zone of the associated sheet 28' between the inner margin of said area 46 and the periphery of the hood 37 for the entrance of vapors to the charge 29' when the cartridge or unit is positioned for use as shown in Figure 1, and is also provided with a second annular, imperforate area 47 closing a central portion of the sheet 28' forming the top closure of the cartridge or unit in a width outwardly from junction with the upper margin of the wall 27' such as to expose but a relatively narrow zone peripherally of the associated sheet 28' through which vapors traversing the charge 29' may escape to the upper end chamber of the member 11. Adjacent the junction of the area 47 with the wall 27', an annular recess or groove opening through the inner face of said wall accommodates a ring gasket 48 sized and disposed for sealing coaction with the outer surface of the line 32 slidably engaged therethrough. Peripheral support for the cartridge or unit in its position of use within the housing member 11 is provided in the form of angle brackets 49 fixed in angularly spaced relation to the interior wall and extending slightly above the upper end of the intermediate housing member 12 to overlap the joint between the members 11 and 12 and engage under the cartridge or unit wall 26' in the same transverse plane as the hood top closure 38. Thus, vapors uprising from the chamber exteriorly about the upper portion of the shroud 40, from which solids and condensate have been returned to the water charge through the space between the shroud and member 12, may enter the charge 29' through only the narrow perforate zone adjacently about the hood 37 and may leave the charge through only the radially-offset perforate zone adjacent the upper margin of the wall 26', thereby providing for thorough circulation of the vapors through and within the charge where they are substantially dewatered and their acidic properties neutralized. Water vapor entrained with the vapor flow adheres to and coats the surfaces of the broken limerock, or equivalent charge material, to a degree adequate to maintain the charge material in condition to react with the acids characteristic of the hydrolyzed exhaust gases, the tortuous passages characterizing the intersticed charge operate to thoroughly scrub, dewater, diffuse, and repetitiously expose to amelioration the gases permeating the charge, while drip from the charge is returned to the water body of the apparatus either through or exteriorly about the shroud 40.

The upper end chamber of the member 11 above the associated cartridge or unit receives the vapor output through the peripheral perforate zone of the upper sheet 28' with further expansive effect upon the vapors and such consequent dewatering and cooling thereof as conditions them for venting through the line 36 free from inimical and objectional properties.

Operation of the assembly organized for use as shown in Figure 1 should be fully readable from the foregoing description. Maintenance of the assembly in condition for effective use requires only rehabilitation of the water body, which can be readily accomplished through the capped access port 16 or the plugged level port 45, removal of dregs and sediment from time to time through the drain aperture 14, and replacement of the cartridges or units of conditioning material as they become clogged or exhausted. The facility with which the lower cartridge may be replaced has been hereinabove explained, and it should be fully apparent that upon separation of the housing members and removal of the hood 37 from the line 32 the upper cartridge is released to slide out of the member 11 and downwardly along the line 32 until free from the latter, whereafter a new cartridge may be positioned for use through simple reversal of the operations set forth.

Through the provision of a plurality of expansion chambers through which the vapors are progressively entrained, a most intimate and thorough gas-water contact is developed which, together with the consequent cooling and cleansing effects, results in a most complete and efficient elimination from the exhaust gases of those properties and characteristics which render the untreated exhaust gases obnoxious.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An exhaust gas conditioner of the character described comprising a multi-section, separable, upright, hollow housing adapted to confine a charge of water in its lower portion, a tubular conduit upstanding interiorly of the housing from connection with the lower section thereof through the water charge in communication with the latter adjacent its base, an exhaust gas input line sealed through the top of said housing in spaced, concentric extension within said conduit to terminate in an open lower end adjacent the base of the conduit and below the inflow communication between the conduit and water charge, whereby said conduit and line function as a pump reactive to the input of gases under the influence of their discharge pressures for the delivery of a gas-water mixture upwardly of the housing from the upper end opening of the conduit about said line, a hood closed at its upper end about said line above the conduit in detachably supported relation with the latter to dispose its open lower end spacedly and concentrically about the upper end of the conduit below said upper end and above the water charge, a shroud spacedly surrounding said hood in detachably supported relation with and inwardly from the housing walls and formed with a restricted open upper end spacedly and concentrically about the upper end of the hood to define a narrow flow passage therebetween and an open lower end depending within the water charge, an outlet to atmosphere at the upper end of the housing, and a diffusing bed unit of intersticed alkaline material substantially insoluble in water and soluble in the gas-water mixture detachably supported by and transversely of the housing about said input line in spaced relation with and between said outlet and the upper end of the shroud.

2. An exhaust gas conditioner of the character described comprising a multi-section, separable, upright, hollow housing adapted to confine a charge of water in its lower portion, a tubular conduit upstanding interiorly of the housing from connection with the lower section thereof through the water charge in communication with the latter adjacent its base, an exhaust gas input line sealed through the top of said housing in spaced, concentric extension within said conduit to terminate in an open lower end adjacent the base of the conduit and below the inflow communication between the conduit and water charge, whereby said conduit and line function as a pump reactive to the input of gases under the influence of their discharge pressures for the delivery of a gas-water mixture upwardly of the housing from the upper end opening of the conduit about said line, a hood closed at its upper end about said line above the conduit in detachably supported relation with the latter to dispose its open lower end spacedly and concentrically about the upper end of the conduit below said upper end and above the water charge, a shroud spacedly surrounding said hood in detachably supported relation with and inwardly from the housing walls and formed with a restricted open upper end spacedly and concentrically about the upper end of the hood to define a narrow flow passage therebetween and an open lower end depending within the water charge, an outlet to atmosphere at the upper end of the housing, a diffusing bed unit of intersticed alkaline material substantially insoluble in water and soluble in the gas-water mixture detachably supported by and transversely of the housing about said input line in spaced relation with and between said outlet and the upper end of the shroud, and a second diffusing bed unit of said alkaline material submerged in detachably supported engagement with the housing within the water charge across the housing and about said conduit in spaced, non-obstructing relation with the inflow communication between the latter and the water charge.

3. An exhaust gas conditioner of the character described comprising a multi-section, separable, upright, hollow housing adapted to confine a charge of water in its lower portion, a tubular conduit upstanding interiorly of the housing from connection with the lower section thereof through the water charge in communication with the latter adjacent its base, an exhaust gas input line sealed through the top of said housing in spaced, concentric extension within said conduit to terminate in an open lower end adjacent the base of the conduit and below the inflow communication between the conduit and water charge, whereby said conduit and line function as a pump reactive to the input of gases under the influence of their discharge pressures for the delivery of a gas-water mixture upwardly of the housing from the upper end opening of the conduit about said line, a hood closed at its upper end about said line above the conduit in detachably supported relation with the latter to dispose its open lower end spacedly and concentrically about the upper end of the conduit below said upper end and above the water charge, a shroud spacedly surrounding said hood in detachably supported relation with and inwardly from the housing walls and formed with a restricted open upper end spacedly and concentrically about the upper end of the hood to define a narrow flow passage therebetween and an open lower end depending within the water charge, an outlet to atmosphere at the upper end of the housing, and a removable and replaceable cartridge unit of intersticed alkaline material substantially insoluble in water and soluble in the gas-water mixture detachably supported by and transversely of the housing about said input line in spaced relation with and as a restricted flow passage between said outlet and the upper end of the shroud.

4. An exhaust gas conditioner of the character described comprising a multi-section, separable, upright, hollow housing adapted to confine a charge of water in its lower portion, a tubular conduit upstanding interiorly of the housing from connection with the lower section thereof through the water charge in communication with the latter adjacent its base, an exhaust gas input line sealed through the top of said housing in spaced, concentric extension within said conduit to terminate in an open lower end adjacent the base of the conduit and below the inflow communication between the conduit and water charge, whereby said conduit and line function as a pump reactive to the input of gases under the influence of their discharge pressures for the delivery of a gas-water mixture upwardly of the housing from the upper end opening of the conduit about said line, a hood closed at its upper end about said line above the conduit in detachably supported relation with the latter to dispose its open lower end spacedly and concentrically about the upper end of the conduit below said upper end and above the water charge, a shroud spacedly surrounding said hood in detachably supported relation with and inwardly from the housing walls and formed with a restricted open upper end spacedly and concentrically about the upper end of the hood to define a narrow flow passage therebetween and an open lower end depending within the water charge, an outlet to atmosphere at the upper end of the housing, a removable and replaceable cartridge unit of intersticed alkaline material substantially insoluble in water and soluble in the gas-water mixture detachably supported by and transversely of the housing about said input line in spaced relation with and as a restricted flow passage between said outlet and the upper end of the shroud, and a second removable and replaceable cartridge unit of said alkaline material submerged in detachably supported engagement with the housing within the water charge across the housing and about said conduit in spaced, non-obstructing relation with the inflow communication between the latter and the water charge.

5. An exhaust gas conditioner of the character described comprising a multi-section, separable, upright, hollow housing adapted to confine a charge of water in its lower portion, a tubular conduit upstanding interiorly of the housing from connection with the lower section thereof through the water charge in communication with the latter adjacent its base, an exhaust gas input line sealed through the top of said housing in spaced, concentric extension within said conduit to terminate in an open lower end adjacent the base of the conduit and below the inflow communication between the conduit and water charge, whereby said conduit and line function as a pump reactive to the input of gases under the influence of their discharge pressures for the delivery of a gas-water mixture upwardly of the housing from the upper end opening of the conduit about said line, a hood closed at its upper end about said line above the conduit in detachably supported relation with the latter to dispose its open lower end spacedly and concentrically about the upper end of the conduit below said upper end and above the water charge, a shroud spacedly surrounding said hood in detachably supported relation with and inwardly from the housing walls and formed with a restricted open upper end spacedly and concentrically about the upper end of the hood to define a narrow flow passage therebetween and an open lower end depending within the water charge, an outlet to atmosphere at the upper end of the housing, a removable and replaceable cartridge unit of intersticed alkaline material substantially insoluble in water and soluble in the gas-water mixture detachably supported by and transversely of the housing about said input line in spaced relation with and as a restricted flow passage between said outlet and the upper end of the shroud, and means promotive of vapor circulation within said cartridge unit, said means comprising an imperforate area partially closing the bottom of the unit inwardly from the unit periphery and an imperforate area partially closing the top of the unit about and outwardly from the input line.

References Cited in the file of this patent
UNITED STATES PATENTS

| | | |
|---|---|---|
| 2,409,825 | Baringoltz | Oct. 22, 1946 |
| 2,611,680 | Ruth | Sept. 23, 1952 |
| 2,677,601 | Ruth | May 4, 1954 |
| 2,678,261 | Ruth | May 11, 1954 |
| 2,785,962 | Ruth | Mar. 19, 1957 |